(12) United States Patent
Wakita

(10) Patent No.: US 10,917,200 B2
(45) Date of Patent: Feb. 9, 2021

(54) COMMUNICATION SYSTEM AND VEHICLE

(71) Applicant: HONDA MOTOR CO., LTD., Tokyo (JP)

(72) Inventor: Kazuyoshi Wakita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/433,196

(22) Filed: Jun. 6, 2019

(65) Prior Publication Data
US 2019/0386786 A1 Dec. 19, 2019

(30) Foreign Application Priority Data

Jun. 13, 2018 (JP) .................................. 2018-112667

(51) Int. Cl.
| | | |
|---|---|---|
| *H04L 1/18* | (2006.01) | |
| *H04L 12/40* | (2006.01) | |
| *H04W 52/02* | (2009.01) | |
| *H04L 12/939* | (2013.01) | |

(52) U.S. Cl.
CPC .......... *H04L 1/1825* (2013.01); *H04L 1/1809* (2013.01); *H04L 12/40* (2013.01); *H04L 49/555* (2013.01); *H04W 52/0216* (2013.01); *H04L 2012/40215* (2013.01); *H04L 2012/40273* (2013.01)

(58) Field of Classification Search
CPC .. H04L 49/555; H04W 52/0216; H04W 76/28
See application file for complete search history.

(56) References Cited

U.S. PATENT DOCUMENTS

| | | | | |
|---|---|---|---|---|
| 2013/0235776 A1* | 9/2013 | Park | ................. | H04W 28/0221 370/311 |
| 2016/0055048 A1* | 2/2016 | Deb | .................... | G06F 11/0709 714/50 |
| 2016/0337268 A1* | 11/2016 | Ishii | ...................... | H04L 1/1829 |
| 2018/0041960 A1* | 2/2018 | Futaki | ................... | H04L 1/1812 |
| 2018/0146507 A1* | 5/2018 | Tsuda | .................... | H04W 68/02 |
| 2018/0293816 A1* | 10/2018 | Garrett | .................. | G07C 5/008 |
| 2019/0386786 A1* | 12/2019 | Wakita | ................. | H04L 12/413 |

FOREIGN PATENT DOCUMENTS

JP 2016-146605 A 8/2016

* cited by examiner

*Primary Examiner* — Raj Jain
(74) *Attorney, Agent, or Firm* — Westerman, Hattori, Daniels & Adrian, LLP

(57) ABSTRACT

A communication circuit unit of an FI-ECU receives a signal from an AT-ECU. An arithmetic processing unit determines transmitted data at a control cycle $\Delta Tn$, transmits a communication data signal including the transmitted data to the AT-ECU at a time point t2 after the start point of the current control cycle $\Delta Tn$, and retransmits it at a time point t3 where a state, in which an ACK signal from the AT-ECU has not been received, has continued for a predetermined period of time. When the current control cycle $\Delta Tn$ is ended in a state in which the ACK signal has not been received, at a time point t5 after the start point of the next control cycle $\Delta Tn$, the arithmetic processing unit transmits the communication data signal including a newest value of the transmitted data determined at the start point of the next control cycle $\Delta Tn$ to the AT-ECU.

13 Claims, 8 Drawing Sheets

COMMUNICATION SYSTEM AND VEHICLE

CROSS REFERENCES TO RELATED APPLICATIONS

The present application claims priority under 35 U.S.C. § 119 to Japanese Patent Application No. 2018-112667, filed Jun. 13, 2018, entitled "Communication System and Vehicle." The contents of this application are incorporated herein by reference in their entirety.

TECHNICAL FIELD

The present disclosure relates to a communication system or the like that performs communication among a plurality of communication devices via a network using TCP/IP or the like as a communication protocol.

BACKGROUND

Conventionally, a system disclosed in Japanese Unexamined Patent Application Publication No. 2016-146605 has been known as a communication system. This communication system is mounted on a vehicle and uses CAN protocol as a communication protocol to perform communication, and includes a communication bus and first and second ECUs which are connected with each other with the communication bus. In the case of this communication system, between the first ECU and the second ECU, frame data is transmitted and received using CAN protocol.

SUMMARY

According to the study by the inventor, in recent years, for a communication system related to an automobile, for example, a communication system in an onboard network or a communication system in a network outside a vehicle that is communicably connected to an onboard network, a communication system capable of transmitting and receiving a large volume of communication data at a high speed has been demanded, due to development demands, technical development, and the like of connected car technology such as automated driving technology and IoT. As a method for realizing this, it is conceivable to use TCP/IP or the like capable of transmitting and receiving a large volume of communication data at a higher speed than CAN protocol, as a communication protocol. However, with respect to the communication system disclosed in Japanese Unexamined Patent Application Publication No. 2016-146605 described above, when TCP/IP or the like is adopted as a communication protocol, there is a risk of causing a problem as described below.

That is to say, in general, in a case where CAN protocol is used as a communication protocol, when a communication device such as a controller serving as a transmission destination of frame data is powered off or disconnected, this communication device as a transmission destination returns no acknowledgement (ACK) signal to a communication device such as a controller serving as a transmission source. However, when a communication device other than the transmission destination is connected to a communication bus, this communication device, upon receiving frame data, returns an ACK signal corresponding to the frame data to the communication device as a transmission source. With this, the transmission processing of the frame data is ended in the communication device as a transmission source.

In contrast, when TCP/IP is used as a communication protocol, for example, there is a risk of causing a problem described below. TCP/IP has a characteristic that, after a communication data signal is transmitted to a communication device as a transmission destination from a communication device as a transmission source with a current control cycle, when a state, in which an ACK signal indicating receipt of the communication data signal has not been received from the communication device as a transmission destination, has continued for a predetermined period of time before the current control cycle ends, at this point, retransmission of the communication data signal is performed by the communication device as a transmission source. With this, when a communication device serving as a transmission destination of communication data is disconnected or powered off, even if a communication device other than the transmission destination is connected to a communication bus, this communication device returns no ACK signal to the communication device as the transmission source. For this reason, the communication device as the transmission source has to set a predetermined timeout period and to continuously perform transmission processing until the timeout period has elapsed.

In that case, in an onboard communication device, in order for control processing or the like to be accurately performed, transmission and reception of data of a control input signal, a detection signal, and the like have to be performed quickly among communication devices. For this, if the timeout period is set to be long as in the general Internet communication, because control data, measurement data, or the like is not able to be quickly transmitted or received, control accuracy is significantly lowered. Furthermore, in the case of control processing performed by an onboard communication device, because data in the past is continuously retransmitted whereas newest data is demanded, control accuracy is lowered even if the retransmitted data in the past has been successfully received.

Thus, it is preferable to provide a communication system or the like capable of appropriately and quickly performing transmission and reception of newest data in a case where a protocol that performs retransmission of data such as TCP/IP is used for network communication.

One aspect of the present disclosure provides a communication system 1 that includes at least a first communication device (FI-ECU 11) and a second communication device (AT-ECU 12) that are configured to be communicable with each other via a network. One of the first communication device and the second communication device (FI-ECU 11) includes: a reception unit (communication circuit unit 11c) configured to receive a signal from the other of the first communication device and the second communication device (AT-ECU 12); a transmitted data determination unit (arithmetic processing unit 11a) configured to determine transmitted data with a predetermined control cycle $\Delta Tn$; and a transmission unit (arithmetic processing unit 11a, communication circuit unit 11c, FIG. 5/STEP 19) configured to transmit a communication data signal including the transmitted data to the other communication device at a time point after the start point and before the end point of a current control cycle (FIG. 5/STEP 14), and to retransmit the communication data signal in accordance with a predetermined communication protocol at a time point where after transmission of the communication data signal, a state, in which a response signal (ACK signal) indicating receipt of the communication data signal from the other communication device has not been received by the reception unit, has continued for a predetermined period of time (value ΔTk·C1ref) up to a time point before the end point of the current control cycle (FIG. 5/STEP 17, YES). After transmission of the communication data signal, when the current control cycle ΔTn is ended in a state in which the response signal (ACK signal) from the other communication device has not been received by the reception unit, at a time point after the start point and before the end point of the next control cycle ΔTn, the transmission unit transmits a communication data signal that is different from the communication data signal transmitted during the current control cycle ΔTn and includes the transmitted data that has been determined by the transmitted data determination unit at the start point of the next control cycle ΔTn to the other communication device (FIG. 5/STEP 13, 14). (It is to be noted that herein the meaning of "the communication data signal including the transmitted data that has been determined at the start point of the next control cycle is different from the communication data signal transmitted during the current control cycle" includes the case that, when the pieces of transmitted data included in the two communication data signals have been determined at different control cycles, the two pieces of transmitted data may be the same values.)

According to this communication system, the transmitted data is determined with a predetermined control cycle, and at a time point after the start point and before the end point of the current control cycle, the communication data signal including the transmitted data is transmitted to the other communication device. Furthermore, at a time point where after transmission of the communication data signal, a state, in which the response signal indicating receipt of the communication data signal from the other communication device has not been received by the reception unit, has continued for a predetermined period of time up to a time point before the end point of the current control cycle, the communication data signal is retransmitted. As described above, even when it is assumed that the communication data signal transmitted from the transmission unit has not been received by the other communication device during the current control cycle for some reason, the communication data signal is retransmitted to the other communication device during the current control cycle, enabling appropriate and quick transmission and reception of data.

Furthermore, after the communication data signal is transmitted, when the current control cycle is ended in a state in which the response signal from the other communication device has not been received by the reception unit, at a time point after the start point and before the end point of the next control cycle, a communication data signal that is different from the communication data signal transmitted during the current control cycle and includes the transmitted data that has been determined by the transmitted data determination unit at the start point of the next control cycle is transmitted to the other communication device. With this, even when communication between the first communication device and the second communication device is temporarily disconnected during the current control cycle for some reason, at a time point after the start point of the next control cycle, appropriate and quick transmission and reception of newest data is possible between the first communication device and the second communication device, enabling to improve control accuracy in the communication devices.

In the present disclosure, it is preferable that the network is an onboard network and the predetermined communication protocol is a TCP/IP protocol.

According to this communication system, in a case where communication is performed via an onboard network, a general communication protocol which is a TCP/IP protocol may be used to achieve a communication system capable of producing an operational advantage as described above.

In the present disclosure, the one communication device (FI-ECU 11) preferably further includes a transmission prohibition unit (arithmetic processing unit 11a, FIG. 5/STEP 10, 27) that prohibits transmission of the communication data signal by the transmission unit in a case where a state, in which the response signal (ACK signal) from the other communication device (AT-ECU 12) has not been received by the reception unit, has continued even after transmission and retransmission of the communication data signal had been performed by the transmission unit, and when a predetermined transmission disabled condition, under which the other communication device is assumed to be in a transmission disabled state, is satisfied (FIG. 5/STEP 12, 18, YES).

According to this communication system, in a case where a state, in which the response signal from the other communication device has not been received by the reception unit, has continued even after transmission and retransmission of the communication data signal had been performed by the transmission unit, and when a predetermined transmission disabled condition, under which the other communication device is assumed to be in a transmission disabled state, is satisfied, transmission of the communication data signal by the transmission unit is prohibited. With this, when transmission and reception of data between the first communication device and the second communication device is disabled due to disorder, disconnection, or the like, in response to that, useless transmission of the communication data signal may be prohibited, enabling to improve convenience.

In the present disclosure, it is preferable that when an integrated value of the number of transmission of the communication data signal by the transmission unit (count value CT2 of a second counter) has reached a predetermined value C2ref (FIG. 5/STEP 12, 18, YES), the transmission prohibition unit determines that the predetermined transmission disabled condition is satisfied (FIG. 5/STEP 10, 27).

According to this communication system, when an integrated value of the number of transmission of the communication data signal by the transmission unit has reached a predetermined value, it is determined that the predetermined transmission disabled condition is satisfied. With this, by appropriately setting this predetermined value, generation of an event in which transmission and reception of data between the first communication device and the second communication device is disabled may be accurately determined.

In the present disclosure, it is preferable that after transmission of the communication data signal by the transmission unit, when a state, in which the response signal from the other communication device has not been received by the reception unit, has continued for a predetermined period of time or longer, the transmission prohibition unit determines that the predetermined transmission disabled condition is satisfied.

According to this communication system, after transmission of the communication data signal by the transmission unit, when a state, in which the response signal from the other communication device has not been received by the reception unit, has continued for a predetermined period of time or longer, the transmission prohibition unit determines that the predetermined transmission disabled condition is satisfied. With this, by appropriately setting this predetermined period, generation of an event in which transmission and reception of data between the first communication device and the second communication device is disabled may be accurately determined.

In the present disclosure, the transmission unit preferably transmits a one device power-off communication signal (communication data signal at the off time) including the transmitted data (engine stop flag F_ENG_OFF) indicating that the one communication device (FI-ECU 11) is in a state enabled to be powered off, as the communication data signal, to the other communication device (AT-ECU 12) (FIG. 8/STEP 45). The one communication device (FI-ECU 11) preferably further includes a one device power-off unit (arithmetic processing unit 11a, FIG. 8/STEP 50) that powers off the one communication device at a time point t25 after reception of an other device power-off communication signal (communication data signal at the off time) being the communication data signal including the transmitted data (AT finish flag F_AT_FIN) indicating that the other communication device is in a state enabled to be powered off, in a case where the response signal (ACK signal at the off time) indicating receipt of the one device power-off communication signal from the other communication device has been received by the reception unit after transmission of the one device power-off communication signal, and upon receiving the other device power-off communication signal from the other communication device. The other communication device (AT-ECU 12) preferably includes an other device power-off unit (arithmetic processing unit 12a, FIG. 9/STEP 68) that powers off the other communication device at a time point t24 after transmission of the other device power-off communication signal.

According to this communication system, as a communication data signal, the one device power-off communication signal including transmitted data indicating that the one communication device is in a state enabled to be powered off is transmitted to the other communication device. Furthermore, in a case where the response signal indicating receipt of the one device power-off communication signal from the other communication device has been received by the reception unit, after transmission of the one device power-off communication signal, and upon receiving, from the other communication device, the other device power-off communication signal being the communication data signal including the transmitted data indicating that the other communication device is in a state enabled to be powered off, the one communication device is powered off at a time point after reception of the other device power-off communication signal. In addition, the other communication device is powered off at a time point after transmission of the other device power-off communication signal. Based on the above-described matters, when the two communication devices are in a state enabled to be powered off, the two communication devices may be powered off without delay, enabling to control power consumption.

Furthermore, a vehicle according to the present disclosure includes any of the configurations of the communication system 1 described above. In the above explanation of the exemplary embodiment, specific elements with their reference numerals are indicated by using brackets. These specific elements are presented as mere examples in order to facilitate understanding, and thus, should not be interpreted as any limitation to the accompanying claims.

BRIEF DESCRIPTION OF THE DRAWINGS

The advantages of the disclosure will become apparent in the following description taken in conjunction with the following drawings.

DETAILED DESCRIPTION

Figure 1:
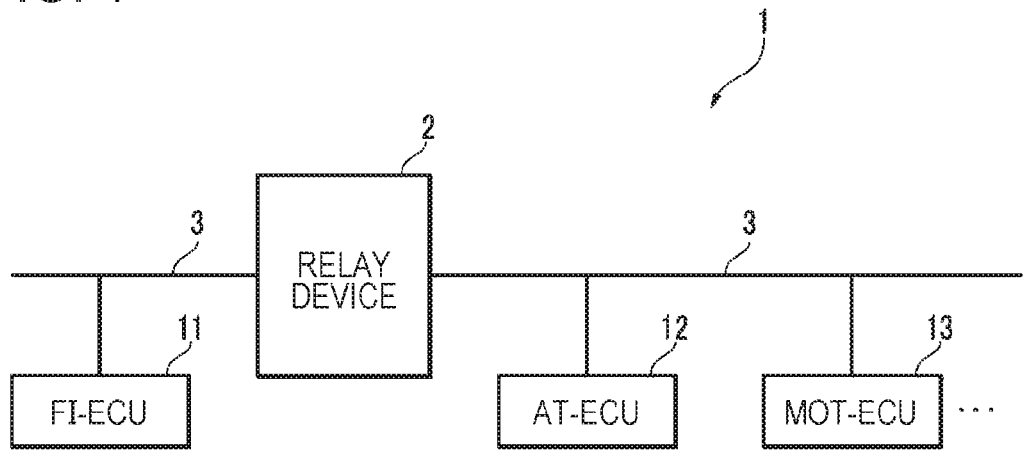
FIG. 1 is a diagram illustrating a configuration of a communication system according to an embodiment of the present disclosure.

Hereinafter, with reference to the drawings, a communication system according to an embodiment of the present disclosure will be described. As illustrated in FIG. 1, a communication system 1 performs communication of various types of data using TCP/IP as a communication protocol, and is mounted on a hybrid vehicle (not illustrated) using an engine and a motor (neither is illustrated) as driving sources.

This communication system 1 includes a plurality of relay devices 2 (only one is illustrated), a plurality of buses 3 (only two are illustrated), a large number of ECUs (only three are illustrated) including an FI-ECU 11, an AT-ECU 12, and an MOT-ECU 13, and the like. MAC addresses and IP addresses of these ECUs are set to different values among each other.

It is to be noted that, in the present embodiment, the FI-ECU 11 corresponds to a first communication device and one communication device, and the AT-ECU 12 corresponds to a second communication device and the other communication device.

This relay device 2 includes an arithmetic processing unit including a CPU, a communication circuit unit for TCP/IP, a storage unit, and the like (none is illustrated), and performs transmission and reception of a communication data signal among the ECUs via the buses 3.

Furthermore, in addition to the large number of ECUs, devices such as various sensors, various switches such as an ignition switch, various actuators, and various motors (none is illustrated) are connected to the plurality of buses 3. Among these elements and the large number of ECUs, transmission and reception of electric signals are performed via the relay device 2 and/or buses 3.

As described later, the FI-ECU 11 performs engine control based on detection signals of the various sensors and performs TCP/IP communication with other ECUs such as the AT-ECU 12 and the MOT-ECU 13 via the relay device 2 and/or buses 3.

Figure 2:
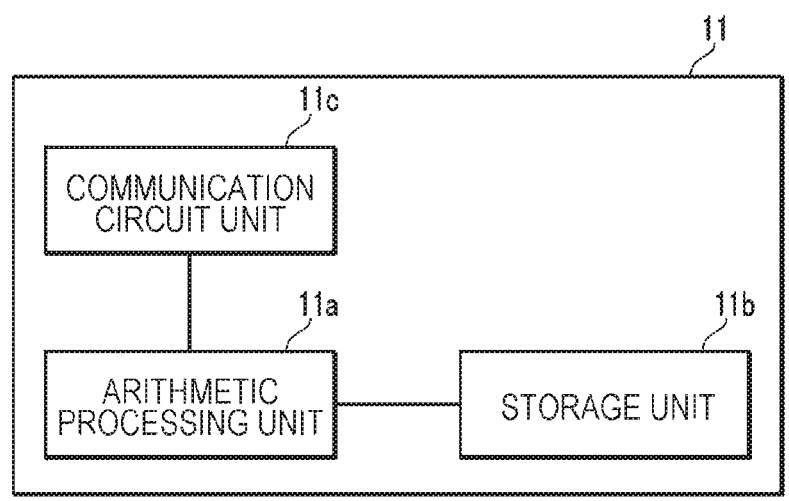
FIG. 2 is a block diagram illustrating a configuration of FI-ECU.

As illustrated in FIG. 2, the FI-ECU 11 includes an arithmetic processing unit 11a, a storage unit 11b, a communication circuit unit 11c, and the like. It is to be noted that, in the present embodiment, the arithmetic processing unit 11a corresponds to a transmitted data determination unit, a transmission unit, a transmission prohibition unit, and a one device power-off unit, and the communication circuit unit 11c corresponds to a reception unit and the transmission unit.

This arithmetic processing unit 11a includes a CPU and the like, and receives communication data signals including calculation results from other ECUs and detection signals from the various sensors via the communication circuit unit 11c and controls operation states of a fuel injection valve of the engine, an ignition plug, and an actuator (none is illustrated) and the like based on these signals and a program in the storage unit 11b. That is to say, the arithmetic processing unit 11a performs engine control.

Furthermore, the storage unit 11b includes a RAM, a ROM, an E2PROM, and the like, and stores therein data of arithmetic processing performed by the arithmetic processing unit 11a, data received from other ECUs and the various sensors, and the like.

Furthermore, the communication circuit unit 11c includes an electric circuit capable of performing TCP/IP communication, and receives the above-described various signals and transmits results of arithmetic processing performed by the arithmetic processing unit 11a to other ECUs as well as transmits a control input signal to the fuel injection valve of the engine, the ignition plug, and the actuator. It is to be noted that, in the present embodiment, the communication circuit unit 11c corresponds to the reception unit and the transmission unit.

Meanwhile, the above-described AT-ECU 12 controls an automatic transmission (not illustrated) of the vehicle based on the driving state of the engine, detection signals of the various sensors, and the like, and as described later, performs transmission and reception of a data signal by TCP/IP communication with other ECUs such as the FI-ECU 11 and the MOT-ECU 13.

Figure 3:
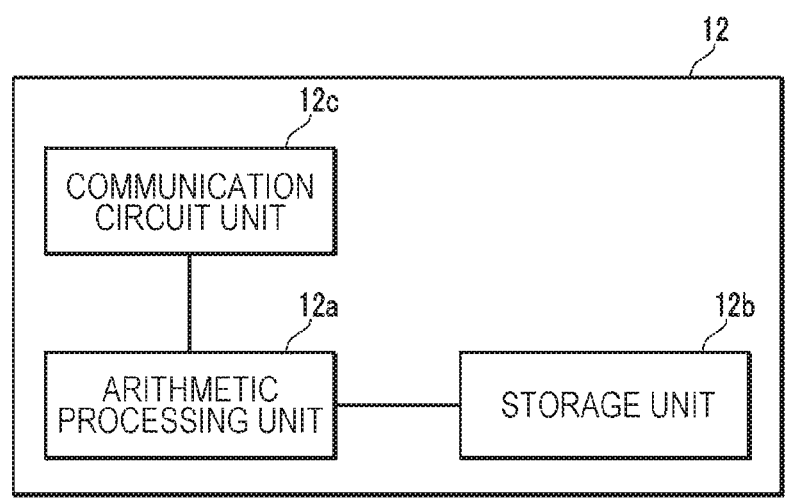
FIG. 3 is a block diagram illustrating a configuration of AT-ECU.

As illustrated in FIG. 3, the AT-ECU 12 includes an arithmetic processing unit 12a, a storage unit 12b, and a communication circuit unit 12c. The arithmetic processing unit 12a, the storage unit 12b, and the communication circuit unit 12c each have the same configuration as that of the corresponding unit of the FI-ECU 11 described above. It is to be noted that, in the present embodiment, the arithmetic processing unit 12a corresponds to an other device power-off unit.

In the case of the AT-ECU 12, the arithmetic processing unit 12a receives communication data signals including results of arithmetic processing of other ECUs, detection signals from the various sensors, and the like via the communication circuit unit 12c and controls the operation state of the automatic transmission based on these signals and a program in the storage unit 12b. That is to say, the arithmetic processing unit 12a performs speed control.

Furthermore, the communication circuit unit 12c receives data signals from other ECUs and the various sensors and transmits results of arithmetic processing performed by the arithmetic processing unit 12a to other ECUs as well as transmits a control input signal to the actuator of the automatic transmission and the like.

Furthermore, the above-described MOT-ECU 13 controls the operation state of the motor as the driving source based on the driving state of the engine, the operation state of the automatic transmission, detection signals of the various sensors, and the like and performs transmission and reception of a data signal by TCP/IP communication with other ECUs such as the FI-ECU 11 and the AT-ECU 12.

The MOT-ECU 13 includes an arithmetic processing unit, a storage unit, a communication circuit unit, and the like similarly to the FI-ECU 11 and the AT-ECU 12 although these units are not illustrated. The arithmetic processing unit, the storage unit, and the communication circuit unit each have the same configuration as that of the corresponding unit of the FI-ECU 11 described above. The arithmetic processing unit of the MOT-ECU 13 receives communication data signals including results of arithmetic processing of other ECUs, detection signals from the various sensors, and the like via the communication circuit unit of the MOT-ECU 13 and controls the operation state of the automatic transmission based on these signals and a program in the storage unit of the MOT-ECU 13. That is to say, the arithmetic processing unit performs speed control.

Furthermore, the communication circuit unit of the MOT-ECU 13 receives data signals from other ECUs and the various sensors and transmits results of arithmetic processing performed by the arithmetic processing unit of the MOT-ECU 13 to other ECUs as well as transmits a control input signal to the motor.

Various types of control processing performed by the FI-ECU 11 and the AT-ECU 12 will be described below. It is to be noted that various values calculated in the control processing described below are to be stored in the RAM of the storage unit in the ECU. Furthermore, flag values are to be reset to all "0" when the ECU is powered off.

Firstly, with reference to FIG. 4, engine control processing performed by the FI-ECU 11 will be described. As described below, this engine control processing is to perform fuel injection control, ignition timing control, and the like, and is performed with a control cycle ΔTn corresponding to a generation cycle (generation interval) of a TDC signal. This TDC signal is output from a crank angle sensor which is not illustrated when each cylinder (not illustrated) of the engine reaches a predetermined crank angle in the vicinity of a TDC.

Figure 4:
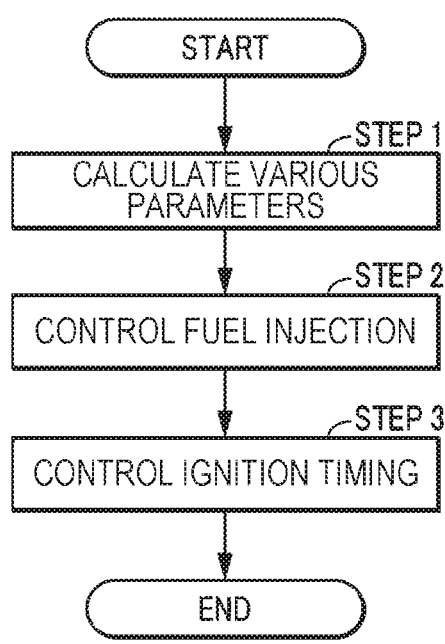
FIG. 4 is a flowchart illustrating engine control processing by FI-ECU.

As illustrated in FIG. 4, firstly, various parameters are calculated (FIG. 4/STEP 1). Specifically, based on the detection signals of the various sensors, parameters such as an engine speed, an engine water temperature, and an accelerator opening are calculated.

Next, fuel injection control processing is performed (FIG. 4/STEP 2). In this fuel injection control processing, a fuel injection amount, an injection timing, and the like of the fuel injection valve are calculated based on the above-described various parameters, and control input signals corresponding to the calculation results are supplied to the fuel injection valve.

Next, ignition timing control processing is performed (FIG. 4/STEP 3). In this ignition timing control processing, an ignition timing is calculated in accordance with the above-described various parameters and injection timing, and a control input signal corresponding to the calculation result is supplied to the ignition plug. As described above, after the ignition timing control processing is performed, this processing is ended.

Next, with reference to FIG. 5, normal time communication control processing performed by the FI-ECU 11 will be described. This normal time communication control processing is to perform transmission of communication data signals from the FI-ECU 11 to the AT-ECU 12 and the like, and is performed by the FI-ECU 11 with a predetermined control cycle ΔTk which is shorter than the above-described control cycle ΔTn.

Figure 5:
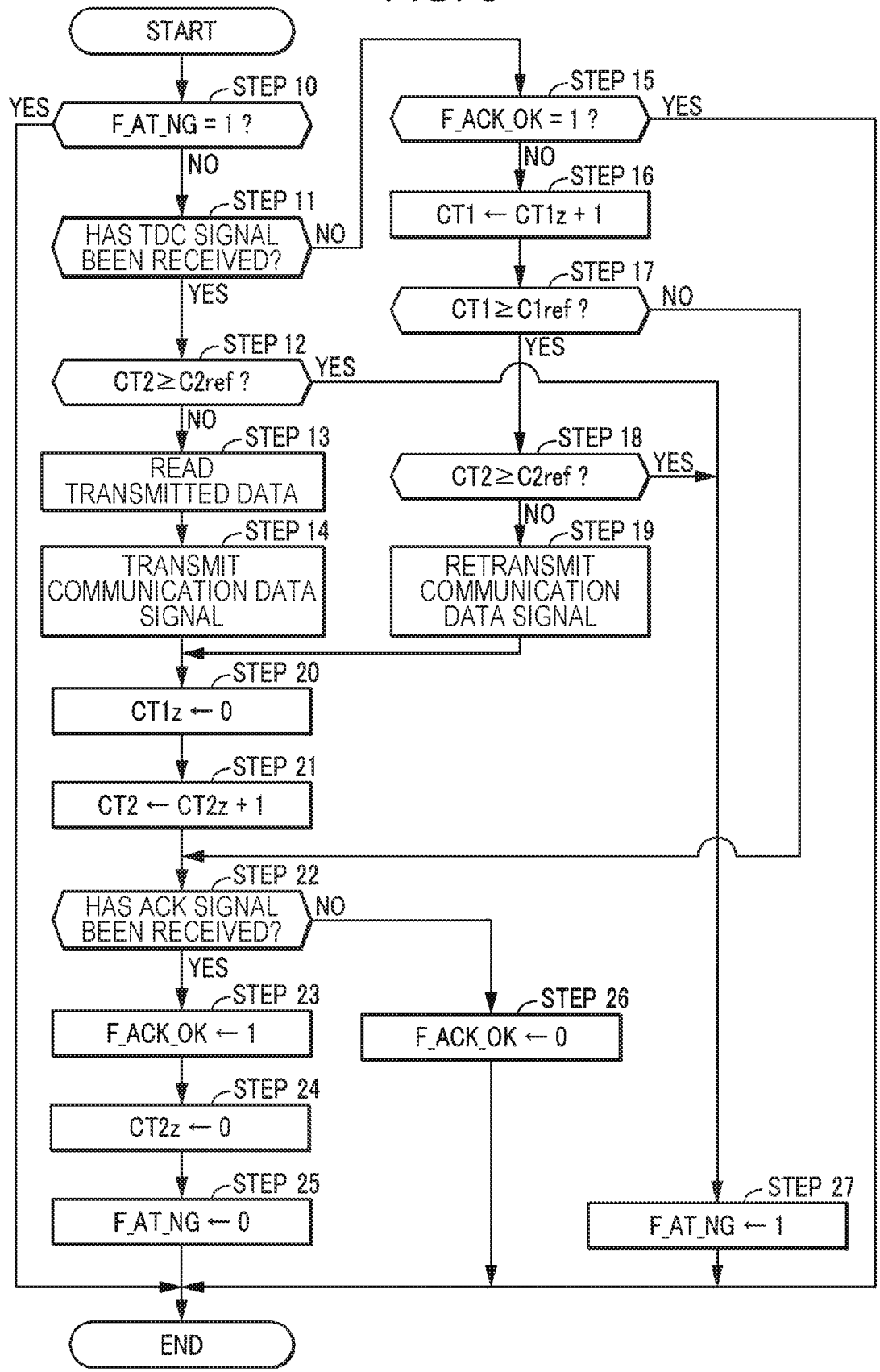
FIG. 5 is a flowchart illustrating normal time communication control processing by FI-ECU.

As illustrated in FIG. 5, firstly, it is determined whether an AT disconnection flag F_AT_NG is "1" (FIG. 5/STEP 10). This AT disconnection flag F_AT_NG indicates whether data communication with the AT-ECU 12 is disabled.

When this determination is positive (FIG. 5/STEP 10, YES), that is, when data communication with the AT-ECU 12 is disabled, this processing is ended with no change.

In contrast, when this determination is negative (FIG. 5/STEP 10, NO), it is determined whether the TDC signal has been received between the last control timing and the current control timing (FIG. 5/STEP 11).

When this determination is positive (FIG. 5/STEP 11, YES), it is determined whether a count value CT2 of a second counter is equal to or higher than a predetermined value C2ref (FIG. 5/STEP 12).

This count value CT2 of the second counter is for integrating the number of transmission of a communication data signal to the AT-ECU 12. This predetermined value C2ref is a value for determining that data communication with the AT-ECU 12 is actually disabled (in the present embodiment, the value is 5). It is to be noted that the number of transmission in this case includes the number of retransmission.

When this determination is positive (FIG. 5/STEP 12, YES), that is, when an integrated value of the number of transmission of a communication data signal has reached the predetermined value C2ref to satisfy CT2≤C2ref at the last control timing, it is determined that data communication with the AT-ECU 12 is actually disabled, so that the AT disconnection flag F_AT_NG is set to "1" to indicate this determination result (FIG. 5/STEP 27). This processing is then ended.

When the AT disconnection flag F_AT_NG is set to "1" as described above, in control processing which is not illustrated, in order to inform the driver of the fact that data communication with the AT-ECU 12 is actually disabled, an indicator light that indicates the fact is lit up on an instrument panel of the vehicle.

In contrast, when this determination is negative (FIG. 5/STEP 12, NO), it is determined that a communication data signal is to be transmitted and transmitted data is read (FIG. 5/STEP 13). This transmitted data corresponds to a piece of data to be transmitted to the AT-ECU 12 (for example, the engine speed) out of pieces of data calculated by the above-described engine control processing.

Next, the communication data signal is transmitted to the AT-ECU 12 (FIG. 5/STEP 14). The content of this communication data signal is specifically structured as follows. That is to say, an IP packet is structured such that IP addresses of the FI-ECU 11 and the AT-ECU 12 are included in a header part and the transmitted data is included in a data part. An Ethernet® frame is structured such that MAC addresses of the FI-ECU 11 and the AT-ECU 12 are included in the header part and the IP packet is included in the data part, and this Ethernet frame is transmitted as a communication data signal.

In contrast, when the above-described determination is negative (FIG. 5/STEP 11, NO), that is, when the TDC signal has not been received between the last control timing and the current control timing, it is determined whether an ACK reception flag F_ACK_OK is "1" (FIG. 5/STEP 15).

This ACK reception flag F_ACK_OK indicates whether to have received, from the AT-ECU 12, an ACK signal indicating that the AT-ECU 12 has received the communication data signal. Furthermore, control processing in which the ACK signal is transmitted by the AT-ECU 12 (ACK signal control processing) will be described later.

When this determination is positive (FIG. 5/STEP 15, YES), that is, when the ACK signal has been received from the AT-ECU 12 after transmission/retransmission of the communication data signal, this processing is ended with no change.

In contrast, when this determination is negative (FIG. 5/STEP 15, NO), a count value CT1 of a first counter is set to a sum CT1z+1 of the previous count value CT1z and a value 1 (FIG. 5/STEP 16). That is to say, the count value CT1 of the first counter is incremented by the value 1. This count value CT1 of the first counter is for clocking the time after transmission/retransmission of the communication data signal to the AT-ECU 12.

Next, it is determined whether the count value CT1 of the first counter has become equal to or higher than a predetermined value C1ref (FIG. 5/STEP 17). When this determination is negative (FIG. 5/STEP 17, NO), the processing proceeds to reception determination of the ACK signal (FIG. 5/STEP 22), which will be described later.

In contrast, when this determination is positive (FIG. 5/STEP 17, YES), that is, when the period of time elapsed after transmission of the communication data signal to the AT-ECU 12 has become equal to or higher than a value ΔTk·C1ref, it is determined whether the count value CT2 of the second counter is equal to or higher than a predetermined value C2ref (FIG. 5/STEP 18).

When this determination is positive (FIG. 5/STEP 18, YES), that is, when CT2<C2ref was satisfied at the last control timing, as described above, the AT disconnection flag F_AT_NG is set to "1" (FIG. 5/STEP 27). Then, this processing is ended.

In contrast, when this determination is negative (FIG. 5/STEP 18, NO), that is, when CT2<C2ref is satisfied, the communication data signal is retransmitted (FIG. 5/STEP 19).

As described above, when the communication data signal is transmitted or retransmitted (FIG. 5/STEP 14, 19), subsequently, the previous value CT1z of the count value of the first counter is set to "0" (FIG. 5/STEP 20).

Next, the count value CT2 of the second counter is set to a sum CT2z+1 of the previous count value CT2z and a value 1 (FIG. 5/STEP 21). That is to say, the count value CT2 of the second counter is incremented by the value 1.

As described above, when the count value CT2 of the second counter is incremented by the value 1, or when the above-described count value CT1 of the first counter is less than the predetermined value C1ref (FIG. 5/STEP 17, NO), subsequently, it is determined whether the ACK signal from the AT-ECU 12 has been received (FIG. 5/STEP 22).

When this determination is positive (FIG. 5/STEP 22, YES), that is, when the ACK signal from the AT-ECU 12 has been received, in order to indicate the receipt, the ACK reception flag F_ACK_OK is set to "1" (FIG. 5/STEP 23).

Next, the previous count value CT2z of the second counter is set to "0" (FIG. 5/STEP 24). Next, in order to indicate that normal data communication with the AT-ECU 12 is possible, the AT disconnection flag F_AT_NG is set to "0" (FIG. 5/STEP 25). Then, this processing is ended.

In contrast, when the above-described determination is negative (FIG. 5/STEP 22, NO), that is, when the ACK signal from the AT-ECU 12 has not been received, in order to indicate no receipt, the ACK reception flag F_ACK_OK is set to "0" (FIG. 5/STEP 26). Then, this processing is ended.

It is to be noted that the above-described normal time communication control processing in FIG. 5 is an example in which when the integrated value of the number of transmission of a communication data signal has reached the predetermined value C2ref with no ACK signal from the AT-ECU 12 received, transmission and retransmission of any communication data signal after the reaching are prohibited. However, the configuration may be set such that after transmission of the communication data signal, when the period of time elapsed with no ACK signal from the AT-ECU 12 received has reached a predetermined determination value, transmission and retransmission of any communication data signal after the reaching are prohibited. In that case, the predetermined determination value may be set in accordance with the vehicle speed.

Next, with reference to FIG. 6, ACK signal control processing performed by the AT-ECU 12 will be described. This ACK signal control processing is performed with the above-described control cycle ΔTk by the AT-ECU 12.

Figure 6:
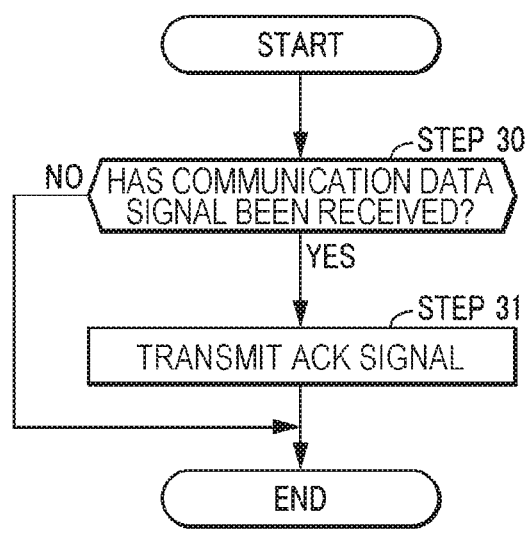
FIG. 6 is a flowchart illustrating ACK signal control processing by AT-ECU.

As illustrated in FIG. 6, firstly, it is determined whether a communication data signal from the FI-ECU 11 has been received (FIG. 6/STEP 30). When this determination is negative (FIG. 6/STEP 30, NO), this processing is ended with no change.

In contrast, when this determination is positive (FIG. 6/STEP 30, YES), in order to notify the FI-ECU 11 of receipt of the communication data signal from the FI-ECU 11, the ACK signal indicating the receipt is transmitted to the FI-ECU 11 (FIG. 6/STEP 31). Then, this processing is ended.

Next, with reference to FIG. 7, an example of a control result when performing the normal time communication control processing in FIG. 5 and the ACK signal control processing in FIG. 6, which have been described above, will be described. This control result represents an example in which data communication with the AT-ECU 12 is disabled due to occurrence of a failure such as disconnection.

Figure 7:
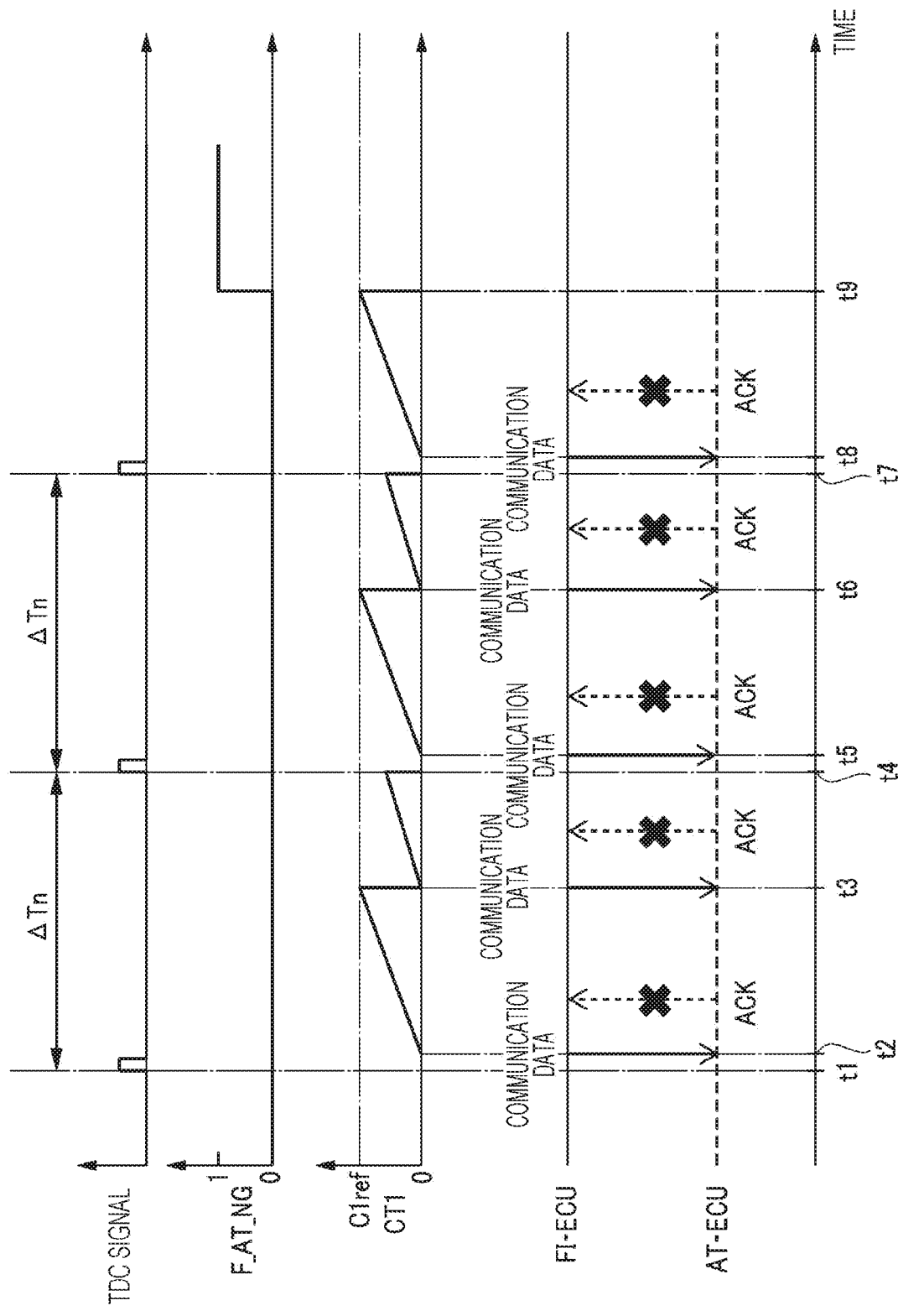
FIG. 7 is a diagram illustrating an example of a control result when control processing in FIGS. 5 and 6 is performed.

As illustrated in FIG. 7, when the TDC signal is input and the control cycle ΔTn is started at a time point t1, the communication data signal is transmitted from the FI-ECU 11 to the AT-ECU 12 at a time point t2 (FIG. 5/STEP 14). Thereafter, the count value CT1 of the first counter is up-counted, and at a timing when CT1≥C1ref is satisfied, that is, at a timing when a duration of a state in which no ACK signal is received from the AT-ECU 12 has become equal to or higher than the value ΔTk·C1ref (time point t3), the communication data signal is retransmitted to the AT-ECU 12 (FIG. 5/STEP 19). In this case, the value ΔTk·C1ref corresponds to the timeout period.

Thereafter, the count value CT1 of the first counter is up-counted, and before CT1≥C1ref is satisfied, the TDC signal is input at a time point t4. Accordingly, when the current control cycle ΔTn is ended and the next control cycle ΔTn is started, at that timing, new transmitted data is calculated by the engine control processing by the FI-ECU 11.

At a time point t5, a communication data signal including the new transmitted data is transmitted from the FI-ECU 11 to the AT-ECU 12. Thereafter, the count value CT1 of the first counter is up-counted, and at a timing when CT1≥C1ref is satisfied (time point t6), the communication data signal is retransmitted to the AT-ECU 12. Thereafter, the count value CT1 of the first counter is up-counted, and before CT1≥C1ref is satisfied, the TDC signal is input at a time point t7. Accordingly, when the current control cycle ΔTn is ended and the next control cycle ΔTn is started, at that timing, new transmitted data is calculated by the engine control processing by the FI-ECU 11.

At a time point t8, a communication data signal including the new transmitted data is transmitted from the FI-ECU 11 to the AT-ECU 12. Thereafter, the count value CT1 of the first counter is up-counted, and at a time point t9, at the same time that CT1≥C1ref is satisfied, CT2≥C2ref is satisfied. Accompanied by this, the AT disconnection flag F_AT_NG is set to "1", whereby transmission/retransmission of communication data signals thereafter are prohibited.

It is to be noted that FIG. 7 illustrates an example in which at one control cycle ΔTn, after transmission of a communication data signal, retransmission has been performed only once. The lower the engine speed, the longer the generation interval of the TDC signal, whereby a state in which the number of retransmission during one control cycle ΔTn is twice or more is to be generated.

Next, end time communication control processing performed by the FI-ECU 11 and that performed by the AT-ECU 12 will be described with reference to FIG. 8 and FIG. 9, respectively. The end time communication control processing is to perform transmission and reception of a communication data signal and an ACK signal between the FI-ECU 11 and the AT-ECU 12 so that the FI-ECU 11 and the AT-ECU 12 perform power-off processing each other when the IG-SW is turned OFF from ON. The end time communication control processing by the FI-ECU 11 and that by the AT-ECU 12 both are performed with the above-described control cycle ΔTk.

Firstly, the end time communication control processing in FIG. 8 which is performed by the FI-ECU 11 will be described. As illustrated in FIG. 8, firstly, it is determined whether the above-described AT disconnection flag F_AT_NG is "1" (FIG. 8/STEP 40).

When this determination is positive (FIG. 8/STEP 40, YES), that is, when data communication with the AT-ECU 12 is disabled, this processing is ended with no change.

Figure 8:
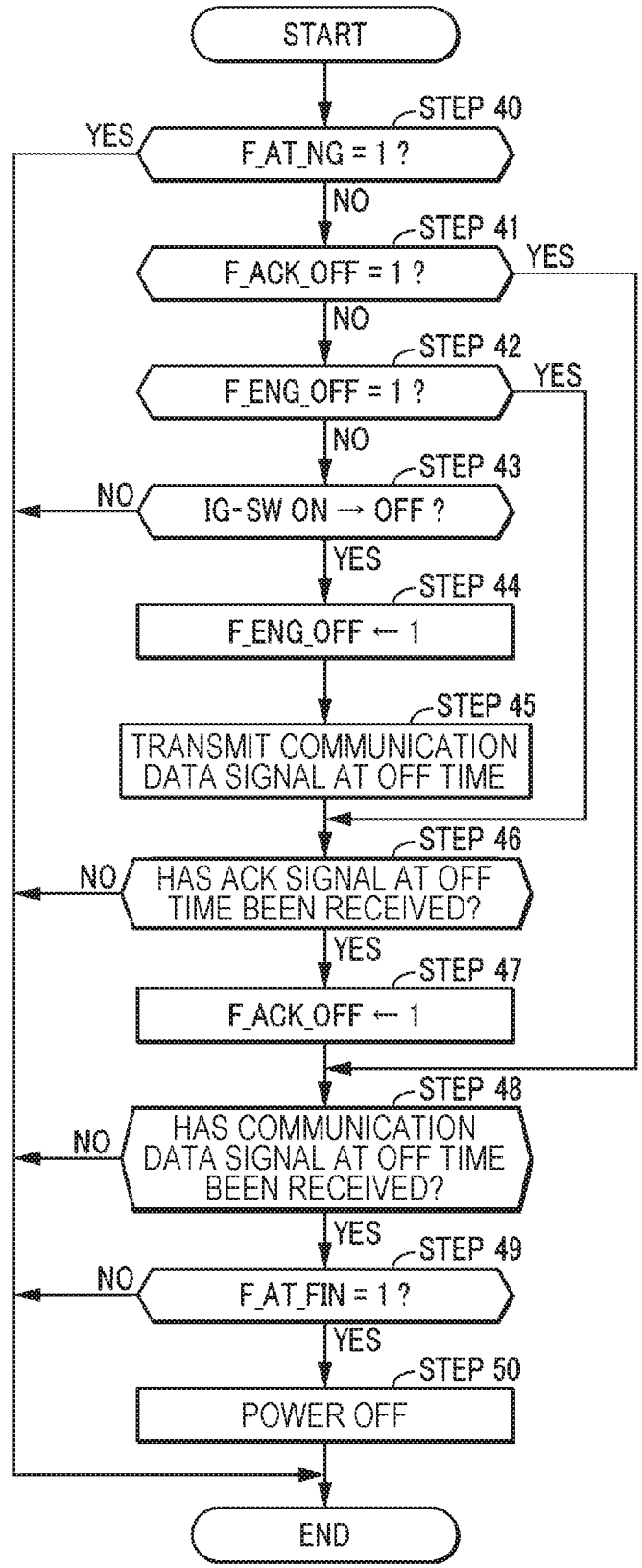
FIG. 8 is a flowchart illustrating end time communication control processing by FI-ECU.

In contrast, when this determination is negative (FIG. 8/STEP 40, NO), it is determined whether an off-time ACK signal reception flag F_ACK_OFF is "1" (FIG. 8/STEP 41). When this determination is positive (FIG. 8/STEP 41, YES), the processing proceeds to a reception determination of a communication data signal from the AT-ECU 12 (FIG. 8/STEP 48), which will be described later.

In contrast, when this determination is negative (FIG. 8/STEP 41, NO), it is determined whether an engine stop flag F_ENG_OFF is "1" (FIG. 8/STEP 42). When this determination is positive (FIG. 8/STEP 42, YES), the processing proceeds to a reception determination of an ACK signal from the AT-ECU 12 at the off time (FIG. 8/STEP 46), which will be described later.

In contrast, when this determination is negative (FIG. 8/STEP 42, NO), it is determined whether the ignition switch has been switched OFF from ON between the last control timing and the current control timing (FIG. 8/STEP 43).

When this determination is negative (FIG. 8/STEP 43, NO), this processing is ended with no change. In contrast, when this determination is positive (FIG. 8/STEP 43, YES), it is determined that the engine is stopped, and in order to indicate the stop, the engine stop flag F_ENG_OFF is set to "1" (FIG. 8/STEP 44).

Next, a communication data signal at the off time is transmitted to the AT-ECU 12 (FIG. 8/STEP 45). This communication data signal at the off time includes the engine stop flag F_ENG_OFF set to the value "1".

As described above, when the communication data signal at the off time is transmitted to the AT-ECU 12, or when the above-described determination is positive (FIG. 8/STEP 42, YES) and F_ENG_OFF=1 is satisfied, subsequently, it is determined whether an ACK signal at the off time has been received from the AT-ECU 12 (FIG. 8/STEP 46). This ACK signal at the off time indicates that the communication data signal including the value of the engine stop flag F_ENG_OFF has been received by the AT-ECU 12.

When this determination is negative (FIG. 8/STEP 46, NO), that is, when the ACK signal at the off time has not been received from the AT-ECU 12, this processing is ended with no change.

In contrast, when this determination is positive (FIG. 8/STEP 46, YES), in order to indicate the receipt, the off-time ACK signal reception flag F_ACK_OFF is set to "1" (FIG. 8/STEP 47).

As described above, when the off-time ACK signal reception flag F_ACK_OFF is set to "1", or when the above-described determination is positive (FIG. 8/STEP 41, YES) and F_ACK_OFF=1 is satisfied, subsequently, it is determined whether the communication data signal at the off time has been received from the AT-ECU 12 (FIG. 8/STEP 48).

When this determination is negative (FIG. 8/STEP 48, NO), this processing is ended with no change. In contrast, when this determination is positive (FIG. 8/STEP 48, YES), it is determined whether an AT finish flag F_AT_FIN included in the communication data signal at the off time from the AT-ECU 12 is "1" (FIG. 8/STEP 49).

When this determination is negative (FIG. 8/STEP 49, NO), this processing is ended with no change. In contrast, when this determination is positive (FIG. 8/STEP 49, YES), the power-off processing of the FI-ECU 11 is performed (FIG. 8/STEP 50). This processing is then ended.

Next, the end time communication control processing in FIG. 9 which is performed by the AT-ECU 12 will be described. As illustrated in FIG. 9, firstly, it is determined whether a power-off determination flag F_OFF_JUD is "1" (FIG. 9/STEP 60).

When this determination is positive (FIG. 9/STEP 60, YES), the processing proceeds to a power-off enabling determination (FIG. 9/STEP 65), which will be described later. In contrast, when this determination is negative (FIG. 9/STEP 60, NO), it is determined whether the communication data signal at the off time has been received from the FI-ECU 11 (FIG. 9/STEP 61).

When this determination is negative (FIG. 9/STEP 61, NO), this processing is ended with no change. In contrast, when this determination is positive (FIG. 9/STEP 61, YES), in order to indicate that the communication data signal at the off time has been received from the FI-ECU 11, the ACK signal at the off time is transmitted to the FI-ECU 11 (FIG. 9/STEP 62).

Figure 9:
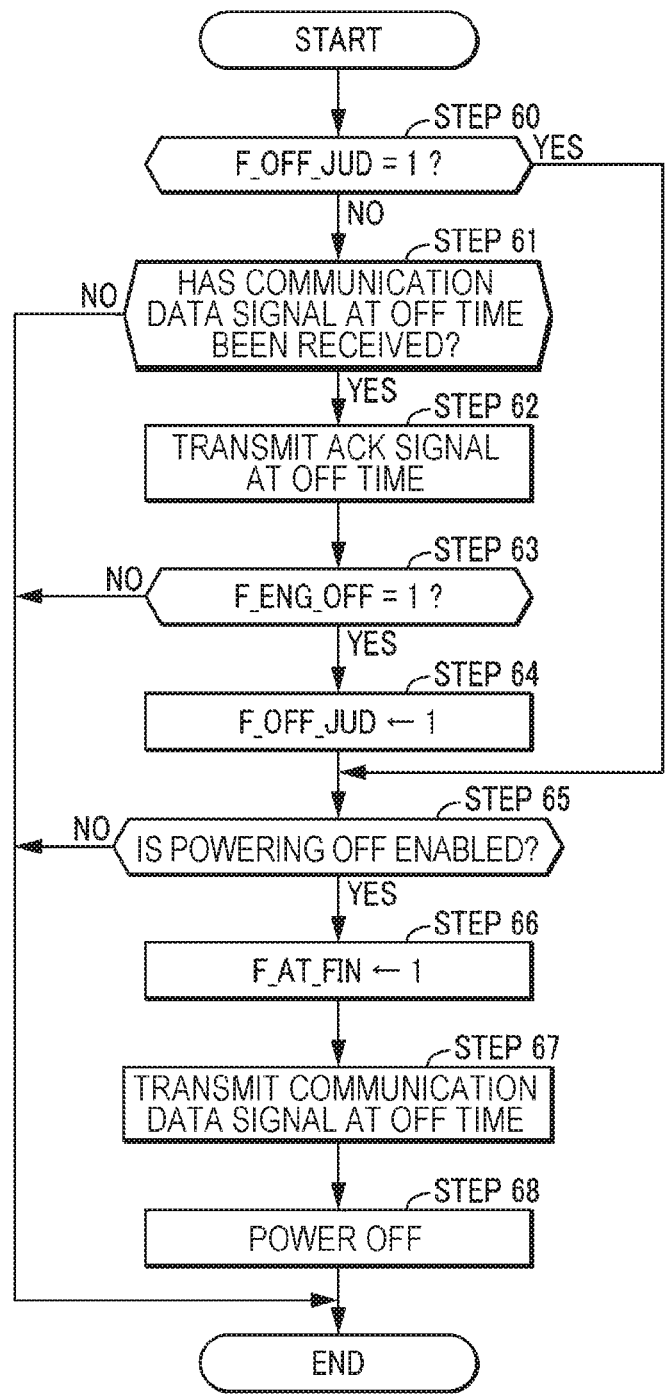
FIG. 9 is a flowchart illustrating end time communication control processing by AT-ECU.

Next, it is determined whether the above-described engine stop flag F_ENG_OFF included in the communication data signal at the off time that has been received from the FI-ECU 11 is "1" (FIG. 9/STEP 63).

When this determination is negative (FIG. 9/STEP 63, NO), this processing is ended with no change. In contrast, when this determination is positive (FIG. 9/STEP 63, YES), in order to indicate that a power-off determination is being made, the power-off determination flag F_OFF_JUD is set to "1" (FIG. 9/STEP 64).

As described above, when the power-off determination flag F_OFF_JUD is set to "1", or when the above-described determination is positive (FIG. 9/STEP 60, YES) and F_OFF_JUD=1 is satisfied at a control timing before the last time, it is determined whether the AT-ECU 12 is in a state enabled to be powered off (FIG. 9/STEP 65).

When this determination is negative (FIG. 9/STEP 65, NO), this processing is ended with no change. In contrast, when this determination is positive (FIG. 9/STEP 65, YES), in order to indicate that the AT-ECU 12 is in a state enabled to be powered off, the AT finish flag F_AT_FIN is set to "1" (FIG. 9/STEP 66).

Next, the communication data signal at the off time is transmitted to the FI-ECU 11 (FIG. 9/STEP 67). This communication data signal at the off time includes the AT finish flag F_AT_FIN set to the value "1".

Next, the power-off processing of the AT-ECU 12 is performed (FIG. 9/STEP 68). Thereafter, this processing is ended.

It is to be noted that in the end time communication control processing in FIG. 8 and FIG. 9, the configuration may be set such that when the FI-ECU 11 has received the value of the AT finish flag F_AT_FIN from the AT-ECU 12, the FI-ECU 11 transmits an ACK signal indicating the receipt to the AT-ECU 12 and then is powered off, and the AT-ECU 12 is powered off after receiving the ACK signal indicating the receipt of the value of the AT finish flag F_AT_FIN from the FI-ECU 11.

Figure 10:
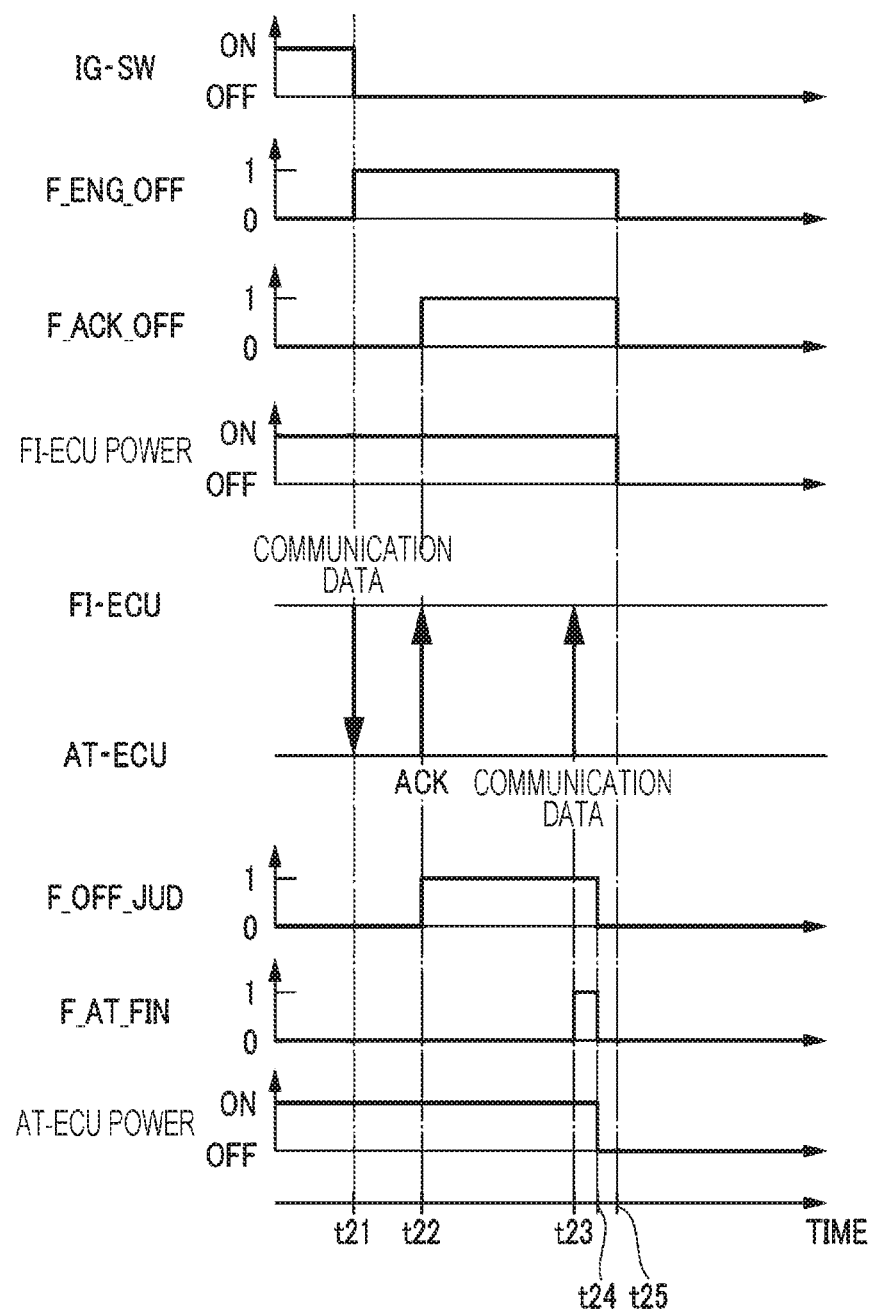
FIG. 10 is a diagram illustrating an example of a control result when control processing in FIGS. 8 and 9 is performed.

Next, with reference to FIG. 10, an example of a control result when performing the end time communication control processing in FIG. 8 and FIG. 9, which have been described above, will be described. As illustrated in FIG. 10, at a time point t21, when the ignition switch (in FIG. 10, referred to as IG-SW) is turned OFF from ON, at that timing, the engine stop flag F_ENG_OFF is set to "1" in the FI-ECU 11, and at the same time, the communication data signal at the off time including the engine stop flag F_ENG_OFF is transmitted to the AT-ECU 12.

Thereafter, in the AT-ECU 12, at a time point t22, at the same time that the ACK signal at the off time indicating the receipt of the communication data signal at the off time has been transmitted to the FI-ECU 11, the power-off determination flag F_OFF_JUD is set to "1".

Furthermore, in the FI-ECU 11, at the timing of receiving the ACK signal at the off time, the off-time ACK signal reception flag F_ACK_OFF is set to "1".

Thereafter, in the AT-ECU 12, at a time point t23, at the same time that the AT finish flag F_AT_FIN is set to "1", the communication data signal at the off time including the AT finish flag F_AT_FIN is transmitted to the FI-ECU 11. Accompanied by this, the power off processing of the AT-ECU 12 is performed, whereby at a time point t24, the AT-ECU 12 is powered off, and at the same time, two flags F_OFF_JUD and F_AT_FIN are reset to "0".

Furthermore, in the FI-ECU 11, at the time point t23, the communication data signal at the off time including the AT finish flag F_AT_FIN set to the value "1" is received, and accompanied by this, the power off processing of the FI-ECU 11 is performed. Thereafter, at a time point t25, at the same time that the FI-ECU 11 is powered off, two flags F_ENG_OFF and F_ACK_OFF are reset to "0".

According to this communication system 1, in the FI-ECU 11, the transmitted data is calculated with a predetermined control cycle $\Delta Tn$, and a time point (time point t2) after the start point of the current control cycle $\Delta Tn$, a communication data signal including the transmitted data is transmitted to the AT-ECU 12. Furthermore, at a time point (time point t3) where after transmission of the communication data signal, a state, in which a response signal indicating receipt of the communication data signal from the AT-ECU 12 has not been received by the reception unit, has continued for the predetermined period of time $\Delta Tk \cdot C1ref$, the communication data signal is retransmitted. As described above, even when it is assumed that the transmitted communication data signal has not been received by the AT-ECU 12 during the current control cycle $\Delta Tn$ for some reason, the transmitted communication data signal is retransmitted to the AT-ECU 12 during the current control cycle ΔTn, whereby transmission and reception of data may be appropriately and quickly performed.

Furthermore, after transmission of the communication data signal, when the current control cycle ΔTn is ended in a state in which no ACK signal has been received from the AT-ECU 12, at a time point (time point t5) after the start point of the next control cycle ΔTn, instead of the communication data signal transmitted during the current control cycle ΔTn, a communication data signal including a newest value of the transmitted data determined by the arithmetic processing unit 11a at the start point of the next control cycle ΔTn is transmitted to the AT-ECU 12. Accordingly, even when communication between the FI-ECU 11 and the AT-ECU 12 is temporarily disconnected during the current control cycle ΔTn for some reason, at a time point after the start point of the next control cycle ΔTn, appropriate and quick transmission and reception of newest data is possible between the FI-ECU 11 and the AT-ECU 12, enabling to improve control accuracy in the FI-ECU 11 and the AT-ECU 12.

Furthermore, in a case where a state, in which no ACK signal from the AT-ECU 12 has been received, has continued even after transmission and retransmission of the communication data signal, when the integrated value CT2 of the number of transmission of the communication data signal has reached the predetermined value C2ref, thereafter transmission of the communication data signal is prohibited. With this, when transmission and reception of data between the FI-ECU 11 and the AT-ECU 12 is disabled due to disorder, disconnection, or the like, in response to that, useless transmission of the communication data signal may be prohibited, enabling to improve convenience.

Meanwhile, in the end time communication control processing of the FI-ECU 11, the communication data signal at the off time including the value of the engine stop flag F_ENG_OFF=1 indicating that the FI-ECU 11 is in a state enabled to be powered off is transmitted to the AT-ECU 12. Thereafter, in a case where the ACK signal at the off time indicating receipt of the communication data signal at the off time has been received from the AT-ECU 12, when the communication data signal at the off time including the value of the AT finish flag F_AT_FIN=1 indicating that the AT-ECU 12 is in a state enabled to be powered off is received from the AT-ECU 12, at the time point t25 after the reception, the FI-ECU 11 is powered off. In contrast, the AT-ECU 12 is powered off at the time point t24 after transmission of the communication data signal at the off time including the value of the AT finish flag F_AT_FIN=1. As described above, when the FI-ECU 11 and the AT-ECU 12 are in a state enabled to be powered off, the FI-ECU 11 and the AT-ECU 12 may be powered off without delay, enabling to control power consumption.

It is to be noted that the embodiment is an example in which the FI-ECU 11 is used as the first communication device, and the AT-ECU 12 is used as the second communication device. However, the first communication device and the second communication device according to the present disclosure are not limited thereto, and may be any devices as long as they are configured to be communicable with each other via a network. For example, the AT-ECU 12 may be used as the first communication device and the FI-ECU 11 may be used as the second communication device. Furthermore, for example, as the first communication device and the second communication device, devices including a controller or a control circuit such as an air conditioner or a car navigation system may be used. Furthermore, these first communication device and second communication device may be applied into devices that are not mounted on a vehicle.

Furthermore, the embodiment is an example in which TCP/IP protocol is used as a predetermined communication protocol. However, a predetermined communication protocol according to the present disclosure is not limited thereto, and may be any protocol as long as it retransmits a communication data signal at a time point where after transmission of the communication data signal, a state, in which a response signal indicating receipt of the communication data signal has not been received, has continued for a predetermined period of time up to a time point before the end point of the current control cycle.

Furthermore, the embodiment is an example in which a communication system is applied into a vehicle. However, the communication system according to the present disclosure is not limited thereto, and may be applied into industrial equipment other than a vehicle. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:
1. A communication system comprising:
a first communication device and a second communication device that are configured to be communicable with each other via a network, wherein
the first communication device includes:
a reception unit configured to receive a signal from the second communication device,
a transmitted data determination unit configured to determine transmission data to be transmitted at a predetermined control cycle, and
a transmission unit configured to:
transmit a communication data signal including the transmission data to the second communication device at a time point after a start point and before an end point of a current control cycle of the predetermined control cycle, and
when, after transmission of the communication data signal, a state, in which a response signal indicating receipt of the communication data signal from the second communication device has not been received by the reception unit, has continued for a predetermined period of time up to a time point before the end point of the current control cycle, retransmit the communication data signal in accordance with a predetermined communication protocol,
wherein, after transmission of the communication data signal, when the current control cycle is ended in a state in which the response signal from the second communication device has not been received by the reception unit, the transmission unit transmits a next communication data signal to the second communication device at a time point after the start point and before the end point of the next control cycle of the predetermined control cycle, wherein the next communication data signal includes the transmission data that has been determined by the transmitted data determination unit at the start point of the next control cycle, wherein the next control cycle is a control cycle next to the current control cycle, wherein the first communication device further includes a transmission prohibition unit that prohibits transmission of the communication data signal by the transmission unit in a case where:

(i) a state, in which the response signal from the second communication device has not been received by the reception unit, has continued even after transmission and retransmission of the communication data signal had been performed by the transmission unit, and (ii) when a predetermined transmission disabled condition, under which the second communication device is assumed to be in a transmission disabled state, is satisfied.

2. The communication system according to claim 1, wherein the network is an onboard network, and the predetermined communication protocol is a TCP/IP protocol.

3. The communication system according to claim 2, wherein the first communication device and the second communication device are included in a onboard computer.

4. The communication system according to claim 1, wherein when an accumulated value of the number of transmission of the communication data signal by the transmission unit has reached a predetermined threshold value, the transmission prohibition unit determines that the predetermined transmission disabled condition is satisfied.

5. The communication system according to claim 1, wherein after transmission of the communication data signal by the transmission unit, when a state, in which the response signal from the second communication device has not been received by the reception unit, has continued for a predetermined period of time or longer, the transmission prohibition unit determines that the predetermined transmission disabled condition is satisfied.

6. The communication system according to claim 1, wherein the transmission unit transmits a first device power-off communication signal including the transmission data indicating that the first communication device is in a state enabled to be powered off, as the communication data signal, to the second communication device, the first communication device further includes a first device power-off unit that powers off the first communication device when:

(i) the response signal indicating receipt of the first device power-off communication signal from the second communication device has been received by the reception unit after transmission of the first device power-off communication signal, and (ii) a second device power-off communication signal being the communication data signal including the transmission data indicating that the second communication device is in a state enabled to be powered off is received, and the second communication device includes a second device power-off unit that powers off the second communication device at a time point after transmission of the second device power-off communication signal.

7. A vehicle comprising:

the communication system according to claim 1.

8. The communication system according to claim 1, wherein the transmission data included in the next communication data signal and the transmission data included in the communication data signal transmitted during the current control cycle have the same value.

9. The communication system according to claim 1, wherein the transmission unit retransmits the communication data signal at a cycle which is shorter than the predetermined control cycle.

10. The communication system according to claim 1, wherein the predetermined communication protocol is a protocol in which, after a communication data signal is transmitted from a sender communication device to a destination communication device at a current control cycle, when a state, in which an ACK signal indicating receipt of the communication data signal has not been received from the destination communication device, has continued for a predetermined period of time, the sender communication device retransmits the communication data signal until the ACK signal is received, and the sender communication device sets a predetermined timeout period and continuously performs retransmission until the timeout period has elapsed.

11. A communication method between a first communication device and a second communication device that are configured to be communicable with each other via a network, wherein the first communication device includes:

a reception unit configured to receive a signal from the second communication device, and a transmitted data determination unit configured to determine transmission data to be transmitted at a predetermined control cycle, wherein the method comprising the steps executed by the first communication device:

(i) transmitting a communication data signal including the transmission data to the second communication device at a time point after a start point and before an end point of a current control cycle of the predetermined control cycle;

(ii) when, after transmission of the communication data signal, a state, in which a response signal indicating receipt of the communication data signal from the second communication device has not been received by the reception unit, has continued for a predetermined period of time up to a time point before the end point of the current control cycle, retransmitting the communication data signal in accordance with a predetermined communication protocol;

(iii) after transmission of the communication data signal, when the current control cycle is ended in a state in which the response signal from the second communication device has not been received by the reception unit, transmitting a next communication data signal to the second communication device at a time point after the start point and before the end point of the next control cycle of the predetermined control cycle, wherein the next communication data signal includes the transmission data that has been determined by the transmitted data determination unit at the start point of the next control cycle, wherein the next control cycle is a control cycle next to the current control cycle; and (iv) prohibiting transmission of the communication data signal in a case where:

(I) a state, in which the response signal from the second communication device has not been received by the reception unit, has continued even after transmission and retransmission of the communication data signal had been performed, and (II) when a predetermined transmission disabled condition, under which the second communication device is assumed to be in a transmission disabled state, is satisfied.

12. The communication method according to claim 11, wherein
the network is an onboard network, and
the predetermined communication protocol is a TCP/IP protocol.

13. A communication system comprising:
a first communication device and a second communication device that are configured to be communicable with each other via a network, wherein
the first communication device includes:
a reception unit configured to receive a signal from the second communication device,
a transmitted data determination unit configured to determine transmission data to be transmitted at a predetermined control cycle, and
a transmission unit configured to:
transmit a communication data signal including the transmission data to the second communication device at a time point after a start point and before an end point of a current control cycle of the predetermined control cycle, and
when, after transmission of the communication data signal, a state, in which a response signal indicating receipt of the communication data signal from the second communication device has not been received by the reception unit, has continued for a predetermined period of time up to a time point before the end point of the current control cycle, retransmit the communication data signal in accordance with a predetermined communication protocol,
wherein, after transmission of the communication data signal, when the current control cycle is ended in a state in which the response signal from the second communication device has not been received by the reception unit, the transmission unit transmits a next communication data signal to the second communication device at a time point after the start point and before the end point of the next control cycle of the predetermined control cycle, wherein the next communication data signal includes the transmission data that has been determined by the transmitted data determination unit at the start point of the next control cycle, wherein the next control cycle is a control cycle next to the current control cycle,
wherein
the transmission unit transmits a first device power-off communication signal including the transmission data indicating that the first communication device is in a state enabled to be powered off, as the communication data signal, to the second communication device,
the first communication device further includes a first device power-off unit that powers off the first communication device when:
(i) the response signal indicating receipt of the first device power-off communication signal from the second communication device has been received by the reception unit after transmission of the first device power-off communication signal, and
(ii) a second device power-off communication signal being the communication data signal including the transmission data indicating that the second communication device is in a state enabled to be powered off is received, and
the second communication device includes a second device power-off unit that powers off the second communication device at a time point after transmission of the second device power-off communication signal.

* * * * *